J. IRVINE.
INTERNAL COMBUSTION ENGINE.
APPLICATION FILED JUNE 10, 1915.
1,179,632.
Patented Apr. 18, 1916.
2 SHEETS—SHEET 1.
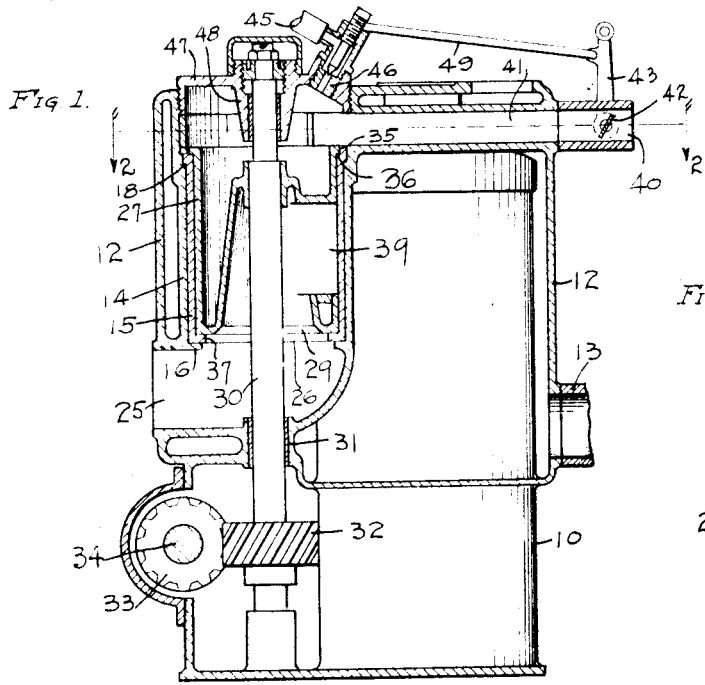
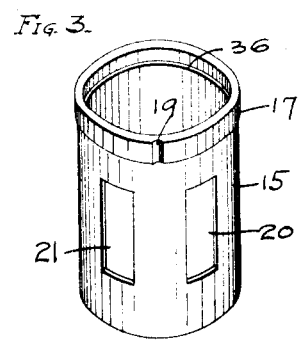
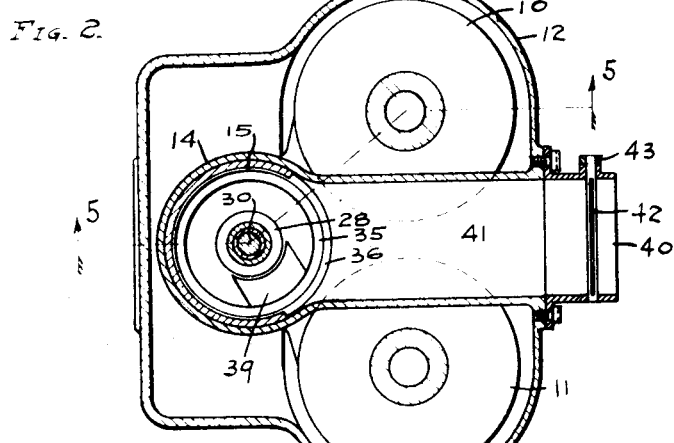
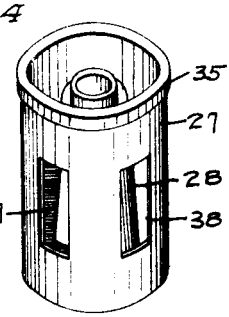
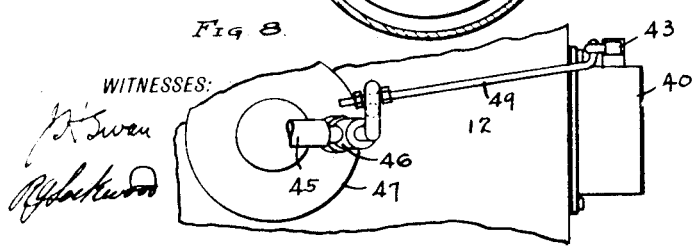
WITNESSES:
INVENTOR
JOHN IRVINE.
BY
ATTORNEY J. IRVINE.
INTERNAL COMBUSTION ENGINE.
APPLICATION FILED JUNE 10, 1915.
1,179,632.
Patented Apr. 18, 1916.
2 SHEETS—SHEET 2.
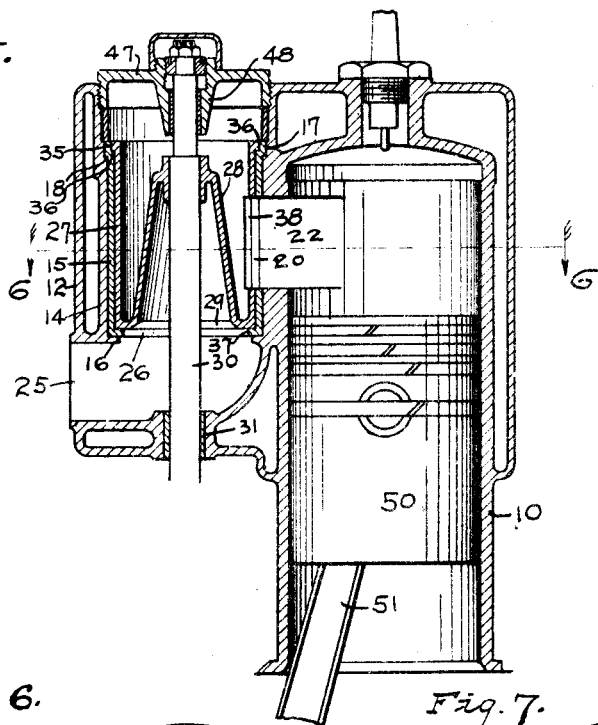
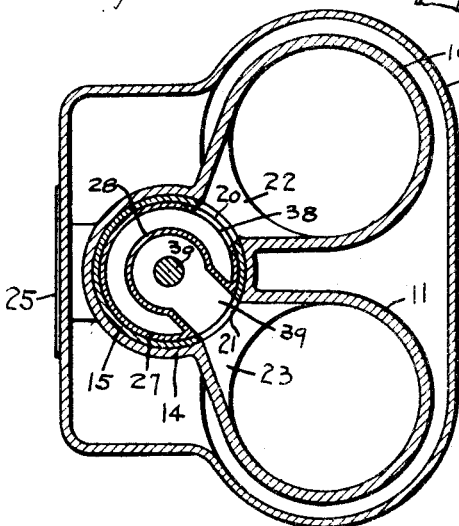
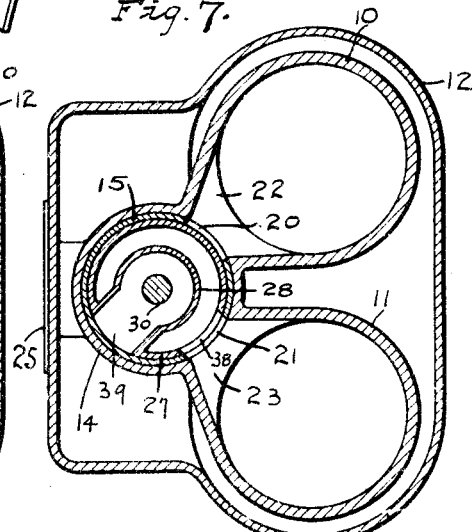
WITNESSES:
INVENTOR
John Irvine
BY
V. H. Lockwood
ATTORNEY

UNITED STATES PATENT OFFICE.

JOHN IRVINE, OF INDIANAPOLIS, INDIANA, ASSIGNOR OF ONE-HALF TO ROBERT V. FESSLER, OF INDIANAPOLIS, INDIANA.

INTERNAL-COMBUSTION ENGINE.

1,179,632.

Specification of Letters Patent.

Patented Apr. 18, 1916.

Application filed June 10, 1915. Serial No. 33,267.

*To all whom it may concern:*

Be it known that I, JOHN IRVINE, a citizen of the United States, and a resident of Indianapolis, county of Marion, and State of Indiana, have invented a certain new and useful Internal-Combustion Engine; and I do hereby declare that the following is a full, clear, and exact description thereof, reference being had to the accompanying drawings, in which like letters refer to like parts.

This invention is to improve the operation of internal combustion engines, particularly in the matter of supplying mixture to the cylinder or cylinders of the engine and exhausting the same therefrom, and to simplify and render more compact the construction of internal combustion engines.

One feature of the invention resides in the valve construction for controlling the intake and exhaust; a single valve being used for both purposes.

Another feature of the invention consists in carbureting the mixture in the valve for controlling the intake and exhaust and thus doing away with the carbureter, as such.

This makes a very compact engine, in which a single valve structure located adjacent the engine cylinder performs three functions, carbureting or preparing the mixture, controlling the intake into the cylinder, and controlling the exhaust therefrom.

The full nature of this invention will be understood from the accompanying drawings and the following description and claims.

In the drawings, Figure 1 is a central vertical section of an internal combustion engine equipped with said invention and having two cylinders, the section line being between said cylinders. Fig. 2 is a horizontal section through the engine on line 2—2 of Fig. 1. Fig. 3 is a perspective view of the valve bushing. Fig. 4 is a perspective view of the valve. Fig. 5 is a section on the line 5—5 of Fig. 2 showing the valve in the intake position for one cylinder. Fig. 6 is a section through the engine on the line 6—6 of Fig. 5, showing the valve in position to permit the intake into one cylinder and the exhaust from the other cylinder. Fig. 7 is the same as Fig. 6 with the valve further operated so as to shut off the intake altogether but exhausting from one cylinder. Fig. 8 is a plan view of a portion of the upper part of Fig. 1.

In detail, the device shown in the drawings to illustrate the general nature of the invention, is an engine having twin cylinders 10 and 11 with a common water jacket 12 supplied through a pipe 13.

Within the surrounding water jacket 12, to one side of the cylinders and on a line between them, as shown in Fig. 2, there is a valve casing 14 stationary and adapted to receive the removable valve bushing 15, which is cylindrical with its lower end resting on a lip 16 on the valve casing, and its upper end having a shoulder 17, see Fig. 3, adapted to rest on the shoulder 18 and the inner wall of the valve casing. Said bushing 15 is stationary and held so by a groove 19 in the shoulder 17 interlocking to the corresponding projection of the valve casing. The valve bushing has two ports 20 and 21 which communicate with the corresponding ports 22 and 23 leading to the two cylinders, as shown in Fig. 6. The foregoing parts are all fixed in position. There is also an exhaust outlet 25 in the engine casing leading from the lower open end 26 of the valve bushing, see Fig. 5.

The valve, for controlling the intake and exhaust, has an external cylindrical wall 27 and an inner hollow conical member 28 flaring downward and outward to the outer wall at the bottom, and with the open lower end 29 of said conical valve member in communication with the open lower end 26 of the valve bushing 15 and the exhaust outlet 25.

The conical member 28 of the valve does not extend as high as the outer wall 27 and is secured on the shaft 30 which is vertical and extends centrally through the openings 26 and 29 and through a bearing 31 in the engine casing and is driven by a worm gear 32 thereon and meshes with the worm gear 33 on a horizontal shaft 34, which is driven by the crank shaft of the engine and intermediate means, not shown. This causes the valve to continually rotate.

The upper end of the valve has a shoulder 35 resting on a corresponding shoulder 36 and the inner wall of the bushing 15, and the lower end of said valve rests upon an inturned flange 37 on said valve bushing so that the valve can rotate in said bushing.

It is observed that the valve, therefore, has two chambers, one between the outer wall 27 and the conical member 28, which may be called the intake chamber, and from it the mixture passes through the intake port 38 to the proper cylinder, with which it may at times be in registry. The other chamber in the valve is located within the conical member 28, which may be called the exhaust chamber, and it is in communication at intervals with the cylinders through an exhaust port 39, see Figs. 1 and 4. Said exhaust port has side, bottom, and top walls, as shown in Fig. 1, leading from the conical member 27 through the conical member 28 through the outer wall 27 of the valve. These ports 38 and 39 are of the same size and same distance apart as the ports 20 and 21 in the valve bushing and the ports 22 and 23 of the cylinders, which are 90° apart.

The mixture is formed when the carbureting takes place within the valve or what has been termed the intake chamber. The air enters the air inlet 40 and passes through an air heated chamber 41 on top of the cylinders into the valve chamber. This air inlet is controlled by an air valve 42 operated by a lever 43 and other suitable connections not shown. The upper end of the main valve for controlling the intake and exhaust is closed by a cap 47 having centrally in it a bearing 48 on the upper end of the shaft 30. There is also a fuel nozzle 46 extending through said cap and directed downwardly so as to supply the incoming fuel which passes downwardly across the path of air entering the valve chamber. Fuel is supplied through some suitable source of supply through the pipe 45 and is controlled by the needle valve 49. This needle valve has an arm 50 on it connected by a link 51 with the air valve member 43 so that the actuation of the latter will cause a corresponding operation of the needle valve.

Normally when the engine is heated, the air valve and needle valve stand almost closed, but partially open, sufficient to supply the engine, when it is not pulling a load. When it is desired to increase the speed or power of the engine, the lever 43 is drawn so as to increase the admission of air and fuel proportionately and this movement may continue until the limit of the capacity of the engine is reached, at which time the air valve 42 will be in a horizontal position and the needle valve opened correspondingly. In other words, in this engine the mixture is controlled in advance, that is, by controlling the supply of air and fuel separately but simultaneously and proportionately, instead of controlling the supply of mixture to the engine after the mixture has been formed, by means of a throttle valve located between the carbureter and engine as is usual.

In each cylinder there is a piston 50 and a piston rod 51 connected with a suitable crank shaft not shown.

The operation will be understood from the following explanation: As shown in Fig. 6 when the valve is in one position, the mixture will be supplied to one cylinder while a quarter turn of the valve to the position shown in Fig. 7 will close the cylinder which has just been supplied with mixture and in it the compression stroke will be taking place. In the other cylinder which was previously exhausted, mixture is now entering as its piston is moving downward. When the valve is given another quarter turn, not shown, the explosion will take place in the first mentioned cylinder 10 and while the mixture is being compressed in the other cylinder 11. In the last quarter turn of the valve, not shown, the cylinder 10 will exhaust and the explosion will take place in the cylinder 11. This cycle will be repeated during the operation of the engine.

While the invention is shown in connection with an engine having two cylinders, still it is not intended to be limited for it can be used in connection with one or with a number of cylinders.

The invention claimed is:

1. An internal combustion engine including a cylinder having a single port for both the intake and exhaust, a cylindrical casing associated with the cylinder and with its upper end closed and its lower end open, means for introducing the mixture into the upper end, a cylindrical valve mounted on said casing and rotated by the engine, and having an outer chamber with its upper end open and lower end closed and an inner chamber with its upper end closed and its lower end open, and ports in the walls of said chambers arranged to register successively with the port of the cylinder.

2. An internal combustion engine having a rotary chambered valve for controlling the intake of the engine, and means for supplying air and hydro-carbon independently to said valve chamber for mixing therein, whereby said valve acts also as the carbureter.

3. An internal combustion engine having a rotary chambered valve for controlling the intake of the engine, and means for supplying air and hydro-carbon independently to said valve chamber for mixing therein, and means for simultaneously and proportionately regulating the supply of air and hydro-carbon to said valve chamber.

4. An internal combustion engine having a cylinder, a valve casing therein with one end closed, a rotary valve in said casing for controlling the intake to the cylinder which has a chamber in communication with the upper end of the valve casing so that there will be one chamber in said valve and the upper end of the valve casing, and means for independently introducing hydro-carbon and air into the chamber in said casing.

5. An internal combustion engine including a cylinder, a valve casing beside said cylinder having its upper end closed, a rotary valve in said casing for controlling the intake to the engine, and having a chamber therein closed at its lower end and opening into the upper end of said casing, an air passage located on the end of the cylinder so that the air therefrom will enter the valve casing chamber horizontally, and means in the upper end of said casing for directing hydro-carbon downward in the path of said current of air, substantially as set forth.

6. An internal combustion engine including a cylinder having a single port for both the intake and exhaust, a cylindrical valve casing associated with the cylinder, a cylindrical valve mounted in said casing rotated by the engine and having an outer chamber with its upper end open and lower end closed and an inner chamber with its upper end closed and its lower end open, ports in the outer walls of said chambers arranged to register successively with the port of the cylinder, means for supplying mixture to one of said valve chambers, and a bushing between said valve and valve casing.

7. An internal combustion engine including a cylinder having a single port for both the intake and exhaust, a cylindrical valve casing associated with the cylinder and open at its two ends with an outwardly annularly extending offset at the upper end and an annular inwardly extending offset at the lower end, a bushing in said casing with corresponding annular offsets at the two ends thereof, and a cylindrical valve mounted in said casing and rotated by the engine and having an outer intake chamber with its upper end open and its lower end closed and an inner exhaust chamber with its upper end closed and its lower end open and with the lower end of said valve resting upon the annular offset at the lower end of said bushing and an outwardly extending annular offset on the upper end of said valve resting upon the annular offset at the upper end of said bushing.

In witness whereof I have hereunto affixed my signature in the presence of the witnesses herein named.

JOHN IRVINE.

Witnesses:
R. G. LOCKWOOD,
MABEL HIMOLD.